United States Patent
Butler et al.

(10) Patent No.: US 8,704,822 B2
(45) Date of Patent: Apr. 22, 2014

(54) VOLUMETRIC DISPLAY SYSTEM ENABLING USER INTERACTION

(75) Inventors: David Alexander Butler, Cambridge (GB); Stephen E. Hodges, Cambridge (GB); Shahram Izadi, Cambridge (GB); Stuart Taylor, Cambridge (GB); Nicolas Villar, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 650 days.

(21) Appl. No.: 12/336,963

(22) Filed: Dec. 17, 2008

(65) Prior Publication Data

US 2010/0149182 A1  Jun. 17, 2010

(51) Int. Cl.
- *G06T 15/00* (2011.01)
- *G02B 5/10* (2006.01)
- *G03H 1/26* (2006.01)

(52) U.S. Cl.
USPC .............................. 345/419; 359/858; 359/23

(58) Field of Classification Search
USPC ............ 345/419, 650, 661, 676; 359/858, 23
See application file for complete search history.

(56) References Cited

U.S. PATENT DOCUMENTS

| | | | |
|---|---|---|---|
| 3,647,284 A * | 3/1972 | Elings et al. | 359/858 |
| 4,323,952 A | 4/1982 | Proske et al. | |
| 4,743,748 A * | 5/1988 | O'Brien | 250/548 |
| 4,843,568 A | 6/1989 | Krueger et al. | |
| 5,572,375 A * | 11/1996 | Crabtree, IV | 359/858 |
| 5,644,369 A | 7/1997 | Jachimowicz et al. | |
| 5,754,147 A | 5/1998 | Tsao et al. | |
| 5,990,990 A * | 11/1999 | Crabtree | 349/74 |
| 6,415,050 B1 | 7/2002 | Stegmann et al. | |
| 6,487,020 B1 | 11/2002 | Favalora | |
| 6,554,430 B2 | 4/2003 | Dorval et al. | |
| 6,765,566 B1 | 7/2004 | Tsao | |
| 6,775,014 B2 | 8/2004 | Foote et al. | |
| 6,806,849 B2 | 10/2004 | Sullivan | |
| 7,134,080 B2 | 11/2006 | Kjeldsen et al. | |
| 7,190,518 B1 | 3/2007 | Kleinberger et al. | |
| 7,239,293 B2 | 7/2007 | Perlin et al. | |
| 7,677,732 B2 | 3/2010 | Moro et al. | |
| 7,884,734 B2 | 2/2011 | Izadi et al. | |

(Continued)

FOREIGN PATENT DOCUMENTS

| | | |
|---|---|---|
| EP | 1852768 A2 | 11/2007 |
| WO | WO2005069641 A1 | 7/2005 |

OTHER PUBLICATIONS

Hodges et al. "ThinSight: Versatile Multi-touch Sensing for Thin Form-factor Displays" ACM UIST 07, Oct. 7-10, 2007 Newport Rhode Island USA.*

(Continued)

*Primary Examiner* — Xiao M. Wu
*Assistant Examiner* — Yingchun He
(74) *Attorney, Agent, or Firm* — Pablo Tapia; Jim Ross; Micky Minhas

(57) ABSTRACT

A volumetric display system which enables user interaction is described. In an embodiment, the system consists of a volumetric display and an optical system. The volumetric display creates a 3D light field of an object to be displayed and the optical system creates a copy of the 3D light field in a position away from the volumetric display and where a user can interact with the image of the object displayed. In an embodiment, the optical system involves a pair of parabolic mirror portions.

16 Claims, 12 Drawing Sheets

(56) References Cited

U.S. PATENT DOCUMENTS

| | | | |
|---|---|---|---|
| 7,924,272 | B2 | 4/2011 | Boer et al. |
| 7,980,957 | B2 * | 7/2011 | Schumm et al. ............ 472/59 |
| 2002/0084951 | A1 | 7/2002 | McCoy |
| 2004/0192430 | A1 | 9/2004 | Burak et al. |
| 2005/0052427 | A1 | 3/2005 | Wu et al. |
| 2005/0064936 | A1 | 3/2005 | Pryor |
| 2005/0180007 | A1 * | 8/2005 | Cossairt et al. ............ 359/465 |
| 2006/0007124 | A1 | 1/2006 | Dehlin |
| 2006/0010400 | A1 | 1/2006 | Dehlin et al. |
| 2006/0036944 | A1 | 2/2006 | Wilson |
| 2007/0046643 | A1 | 3/2007 | Hillis et al. |
| 2007/0201863 | A1 | 8/2007 | Wilson et al. |
| 2007/0291035 | A1 | 12/2007 | Vesely et al. |
| 2008/0029691 | A1 | 2/2008 | Han |
| 2008/0231926 | A1 * | 9/2008 | Klug et al. ............ 359/23 |
| 2008/0281851 | A1 | 11/2008 | Izadi et al. |
| 2009/0025022 | A1 * | 1/2009 | Blatchley et al. ............ 725/9 |
| 2009/0237576 | A1 | 9/2009 | Nelson et al. |
| 2010/0149182 | A1 | 6/2010 | Butler et al. |
| 2011/0128555 | A1 * | 6/2011 | Rotschild et al. ............ 356/625 |

OTHER PUBLICATIONS

Blundell, et al., Creative 3-D Display and Interaction Interfaces: A Trans-Disciplinary Approach, Wiley & Sons, 2006.

Blundell, Enhanced Visualization: Making Space for 3-D Images, Wiley & Sons, 2007.

Jones, et al., "Rendering for an Interactive 360* Light Field Display", retrieved on Jun. 18, 2008 at <<http://gl.ict.usc.edu/Research/3DDisplay/>>, SIGGRAPH 2007 Papers Proceedings SIGGRAPH 2007 Emerging Technologies, 3 pages.

Mirage by OPTI-GONE International, retrieved on the internet on Jan. 13, 2009 at <<http://www.optigone.com>>.

Reinhart, et al., "A Projection-based User Interface for Industrial Robots", retrieved on Jun. 18, 2008 at <<http://ieeexplore.ieee.org/iel5/4373911/4373912/04373930.pdf?tp=&isnumber=4373912&arnumber=4373930&htry=3>>, VECIMS 2007—IEEE International Conference on Virtual Environments, Human-Computer Interfaces, and Measurement Systems, Ostuni, Italy, Jun. 25-27, 2007, pp. 67-71.

Robinett, et al., "The Visual Display Transformation for Virtual Reality", retrieved on Jun. 18, 2008 at <<http://www.cs.jhu.edu/~cohen/VirtualWorlds/media/pdf/Robinett_Holloway_94-031.pdf>>, TR94-031, Sep. 1994, 30 pages.

Cao, et al., "Multi-User Interaction using Handheld Projectors", retrieved on Jul. 30, 2010 at <<http://citeseerx.ist.psu.edu/viewdoc/download?doi=10.1.1.91.9596&rep=rep1&type=pdf>>, ACM, Proceedings of Symposium on User Interface Software and Technology (UIST), Newport, Rhode Island, Oct. 2007, pp. 43-52.

Clark, "3D Without Glasses, That's Crazy Talk!", retrieved on Jul. 30, 2010 at <<http://www.wegotserved.com/2010/07/11/3d-glasses-crazy-talk/>>, We Got Served, 2007, pp. 1-7.

Dodgson, "Autostereoscopic 3D Displays", retrieved on Jul. 30, 2010 at <<http://ieeexplore.ieee.org/stamp/stamp.jsp?arnumber=01492263>>, IEEE Computer Society, Computer Journal, vol. 38, No. 8, Aug. 2005, pp. 31-36.

"Glasses-Free Tabletop 3D Display for omnidirectional viewing by multiple viewers has been successfully developed—Floating virtual 3D objects appearing on a flat tabletop surface-", retrieved on Jul. 30, 2010 at <<http://www2.nict.go.jp/pub/whatsnew/press/h22/100701/100701_e.html#link02>>, NICT, Jul. 1, 2010, pp. 1-5.

Grabham, "SecondLight explained: MS Surface on steroids, We get hands on with Microsoft's 3D interface and display", retrieved on Jul. 30, 2010 at <<http://www.techradar.com/news/computing/secondlight-explained-ms-surface-on-steroids-598017>>, Techradar, May 11, 2009, pp. 1-2.

Izadi et al., "C-Slate: A Multi-Touch and Object Recognition System for Remote Collaboration Using Horizontal Surfaces", IEEE, 2007, pp. 8.

Jones, et al., "Rendering for an Interactive 360 degree Light Field Display", retrieved on Jul. 30, 2010 at <<http://gl.ict.usc.edu/Research/3DDisplay/>>, University of Southern California, ICT Graphics Lab, 2007, pp. 1-4.

Malik, et al., "Visual Touchpad: A Two-handed Gestural Input Device", ACM, 2004, pp. 8.

PureDepth—"What's MLD? What Every LCD Should Be . . . ," retrieved from <<http://webarchive.org/web/20070717212430/www.puredepth.com/what.html>> on Feb. 9, 2009.

Wellner, "Interacting with Paper on the Digitaldesk", ACM, vol. 36, No. 7, 1993, pp. 87-96.

Wilson, "PlayAnywhere: A Compact Interactive Tabletop Projection-Vision System", ACM, 2005, p. 10.

Wilson, "TouchLight: An Imaging Touch Screen and Display for Gesture-Based Interaction", ACM, 2004, pp. 8.

Wu, et al., "Multi-Finger and Whole Hand Gestural Interaction Techniques for Multi-User Tabletop Displays", ACM, vol. 5, Issue 2, 2003, pp. 193-202.

Office Action for U.S. Appl. No. 12/040,629, mailed on Mar. 6, 2012, Shahram Izadi, "Interactive Surface Computer with Switchable Diffuser", 9 pages.

* cited by examiner

US 8,704,822 B2

VOLUMETRIC DISPLAY SYSTEM ENABLING USER INTERACTION

BACKGROUND

There are a number of different technologies which have been used to create three-dimensional (3D) displays. Some of the technologies simulate depth using a planar display screen through visual effects and require glasses to be worn by onlookers. Volumetric displays, however, create a 3D light field within a volume which can be viewed by an onlooker without any requirement for special glasses. These volumetric displays may also be described as autostereoscopic because they create a 3D image which is visible to the unaided eye.

In an example of a volumetric display, different images (or different views of an object) are projected synchronously onto a rotating holographic mirror. The projection of the different images builds up a 3D image which can be seen from different viewpoints. Another example of a volumetric display uses a stack of switchable diffusers. Different depth images are projected in sequence onto the stack of diffusers, in order to simulate the 3D scene data which would be visible at different slices through the volume. Both these examples make use of the speed of refresh and user perceived visual continuity to enable a 3D image to be fused together.

The embodiments described below are not limited to implementations which solve any or all of the disadvantages of known volumetric displays.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A volumetric display system which enables user interaction is described. In an embodiment, the system consists of a volumetric display and an optical system. The volumetric display creates a 3D light field of an object to be displayed and the optical system creates a copy of the 3D light field in a position away from the volumetric display and where a user can interact with the image of the object displayed. In an embodiment, the optical system involves a pair of parabolic mirror portions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
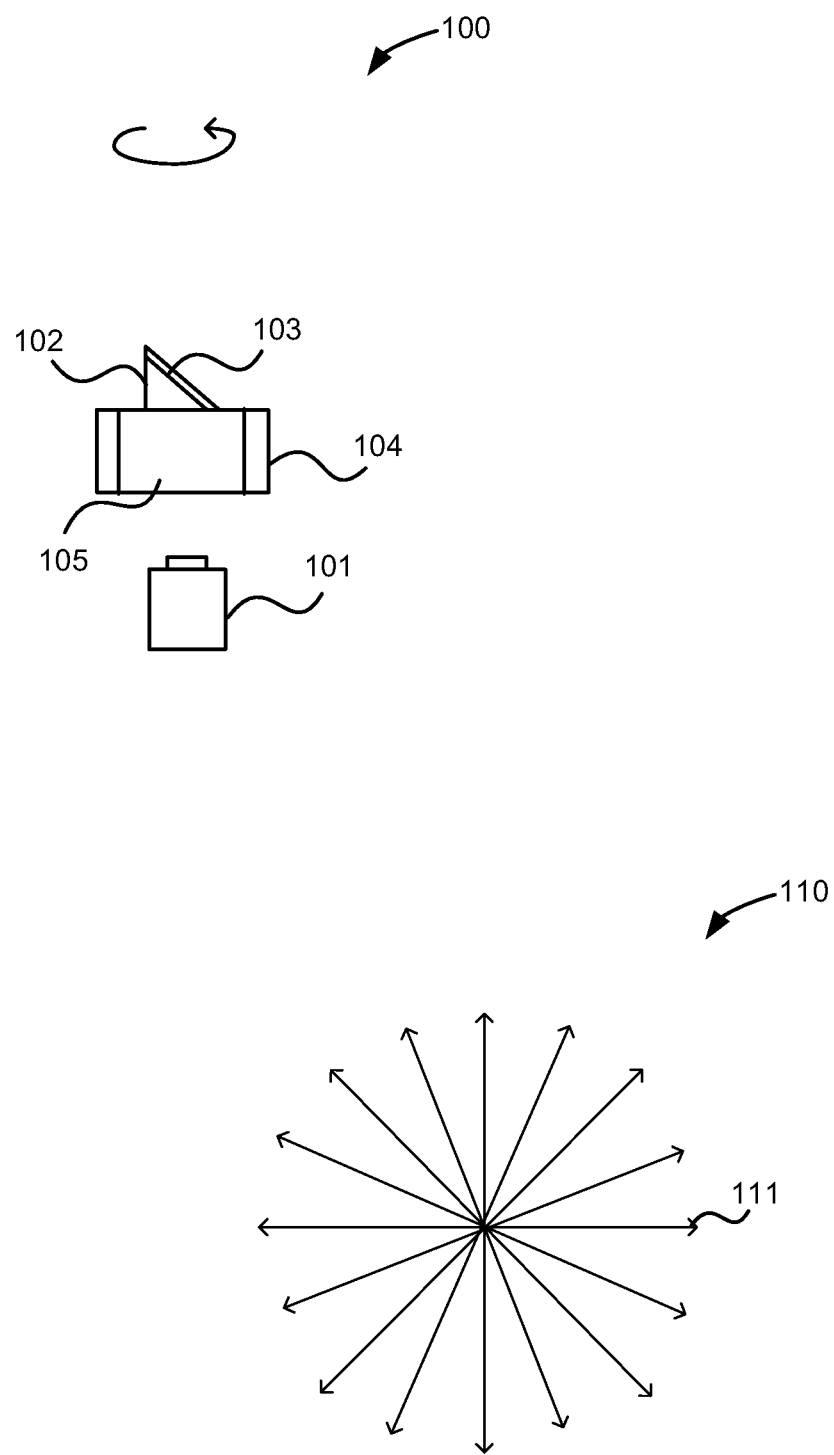
FIG. 1 shows schematic diagrams of a volumetric display and the viewing angles of such a display.

FIG. 1 shows a schematic diagram of a volumetric display 100 which uses bottom up projection (i.e. the projector is on the opposite side of the image plane/region to the viewer). The volumetric display 100 comprises a projector 101 and an angled diffuser 102 (e.g. a 45° diffuser) which, in use, is rotated at high speed (e.g. tens of rotations per second) in front of the projector. The angled diffuser 102 has a directional filter (which may be in the form of a coating) 103, such as holographic film or privacy film (e.g. which comprises micro-louvers and operates in a manner which analogous to a Venetian blind), which provides a very narrow viewing angle for an image formed by projection onto the diffuser (in at least the plane of rotation, which is horizontal in the orientation shown in FIG. 1 and in some examples in two dimensions, the plane of rotation and in a perpendicular direction). Taken to its limit, the directional filter 103 has the effect that a viewer can only see the projected image when looking directly at (i.e. at 90° to) the angled surface of the diffuser. In order to create a 3D light field, multiple images are projected onto the diffuser and these projected images are synchronized with the rotation of the diffuser to project a large number (e.g. 360) of different views of an object which can be seen at different viewing angles. A viewer sees a 3D image because they can see more than one view concurrently (e.g. one with each eye) and/or because lateral head movement results in seeing different views.

FIG. 1 also comprises a simplified schematic diagram 110 which shows 16 different viewing angles 111 which may be generated by the synchronous projection of 16 different views of an object onto the rotating angled diffuser 102 with a directional filter 103. In an actual implementation, there may be a much larger number of viewing angles. For example, 360 different views of an object may be projected at 360 different viewing angles.

It will be appreciated that any reference to generation of a 3D display of an object (or a 3D light field of an object) herein is by way of example only and the 3D display may show one or more objects which may be static or animated objects (or a combination thereof).

The rotation of the angled diffuser 102 may be achieved using any suitable mechanism. In the example 100 shown in FIG. 1, the angled diffuser 102 is mounted on a rotation stage 104 which has an optically transparent center 105. The projector 101 may be any suitable type of projector and the projector used may be dependent upon the required frame rate (e.g. based on the number of viewing angles and the refresh rate). In some examples multiple projectors may be used.

The volumetric display 100 shown in FIG. 1 creates a 3D image which can be viewed by a viewer and if the viewer moves around the rotating angled diffuser they can see all the sides of an object (i.e. they can view each of the different viewing angles 111). The display does not, however, display a different image if the viewer moves their head vertically. The same view is visible irrespective of the viewing height and this is also true for many volumetric displays.

Figure 2:
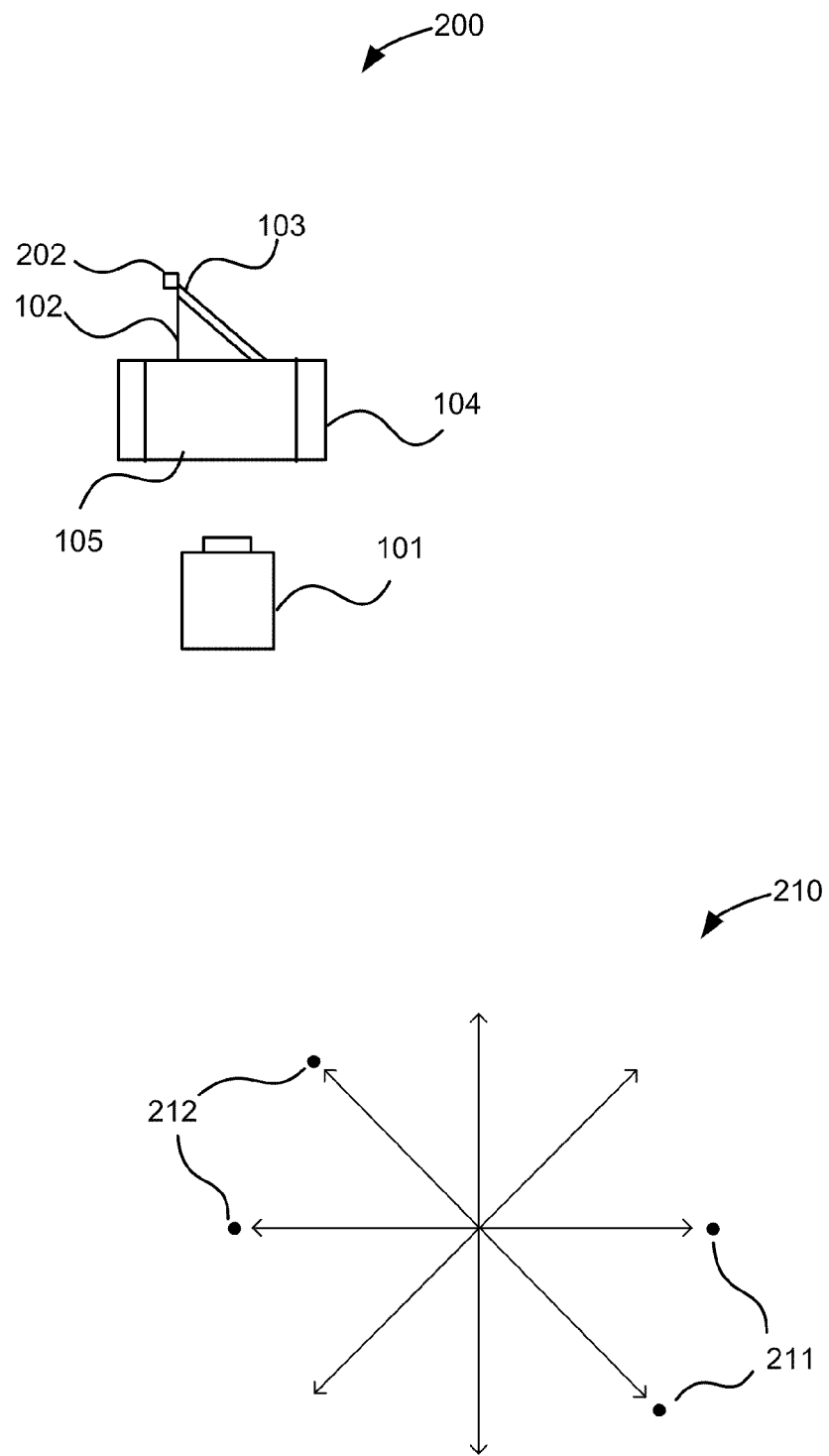
FIG. 2 shows schematic diagrams of another volumetric display and the viewing angles of such a display.

In order to create a fully autostereoscopic volumetric display (i.e. one where the view seen does change with viewing height), the display shown in FIG. 1 may be modified, as shown in FIG. 2. In the volumetric display 200 shown in FIG. 2, an optical sensor 202 beside the angled diffuser 102 and is used to perform head tracking of viewers using the volumetric display 200. The optical sensor 202 may alternatively be located anywhere on the rotation stage 104 where it can perform head tracking without obstructing the projection of the image onto the angled diffuser 102.

The head tracking or eye detection performed by the volumetric display may use any suitable mechanism. In an example, computer vision techniques may be used to detect heads, eyes and/or faces or infra-red illumination may be used with the optical sensor 202 detecting bright reflections from viewers' eyes.

Having detected, using the optical sensor 202, the positions of viewers' heads relative to the display 200, the projected views of the object may be adjusted based on the known viewing height(s). In the simplified schematic diagram 210 shown in FIG. 2, if a first viewer (or first group of viewers) are detected in the region of viewing angles indicated 211 at a first height, $h_1$, and a second viewer (or second group of viewers) are detected in the region of viewing angles indicated 212 at a second height, $h_2$, the images of the object which are projected at these viewing angles may corrected for the known viewing height (e.g. $h_1$ for angles 211 and $h_2$ for angles 212).

In addition to, or instead of, using the known user positions (as a result of the head/eye tracking) to determine viewing height and project corrected images of the object, the known user positions may be used to focus the use of the available projection (or display) frame rate on the range of viewing angles where users are located, e.g. by reducing the angular separation of the projected frames, by increasing the refresh rate for any particular viewing angle and/or by only generating images (for projection/display) for the appropriate viewing arc. For example, if viewers are known to only exist over a 180° angular region (which may be referred to as the 'viewing arc' e.g. in the plane of rotation of the diffuser 102) and the frame rate is limited to 180 frames per second, these 180 frames may be used project a different view of the object at 1° increments in viewing angle (rather than 2° over the entire 360°) or to double the refresh rate, or in providing some combination of reduced angular separation of projected views and increased refresh rate. In another example, images may only be generated for S views either side of the detected position of a user (i.e. ±S views, where S is an integer and may be set for a particular system).

Although in FIG. 2, the optical sensor 202 is shown located on the rotation stage 104, it will be appreciated that this is by way of example only and in other examples, the optical sensor may be located elsewhere (e.g. co-located with the projector 101) and in some examples additional optical elements (e.g. mirrors and/or lenses) may be used. In some examples, an aperture may be provided in the angled diffuser 102. In another example, the diffuser may be switchable (e.g. using an electrically switchable material such as PSCT (Polymer Stabilised Cholesteric Textured liquid crystal) or PDLC (Polymer Dispersed Liquid Crystal) which is switched between a diffuse and clear state alternately such that a synchronised optical sensor (for example, camera, 3D camera etc) can see through the switchable diffuser when it is in its clear state. When the switchable diffuser is in its diffuse state the optical sensor may also be used to sense the light impinging on the diffuser from the projector and/or from external light sources hitting the diffuser from the same or other side of the diffuser. The optical sensor 202 may be used to sense the optical state of the diffuser (e.g. whether it is in a clear or diffuse state).

As with known volumetric displays, the volumetric displays 100, 200 shown in FIGS. 1 and 2 do not enable a user to physically interact directly with the generated 3D image because of the physical arrangement of the display. In the examples shown in FIGS. 1 and 2 the angled diffuser which is rotated at high speed means that it is dangerous for the user to place fingers inside the display and such displays may include a transparent guard to prevent such interaction (not shown in FIGS. 1 and 2). The same is true for examples which include a rotating mirror (e.g. as described earlier). The angled diffuser 102 (with the directional filter 103) and the rotating holographic mirror may be considered examples of directional optical elements. In the case of the stacked diffusers, as described earlier, the display is physically solid and it is not possible to physically interact with or touch the apparent 3D image.

Figure 3:
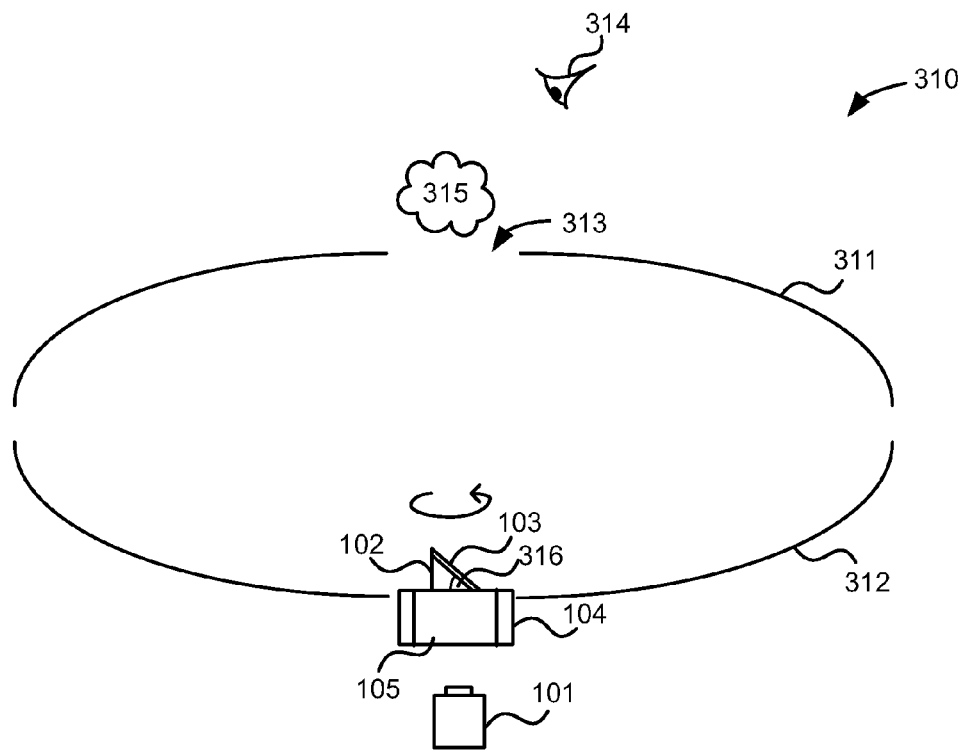
FIG. 3 shows a block diagram of a volumetric display system and two views of an example implementation of such a system.
Figure 3:
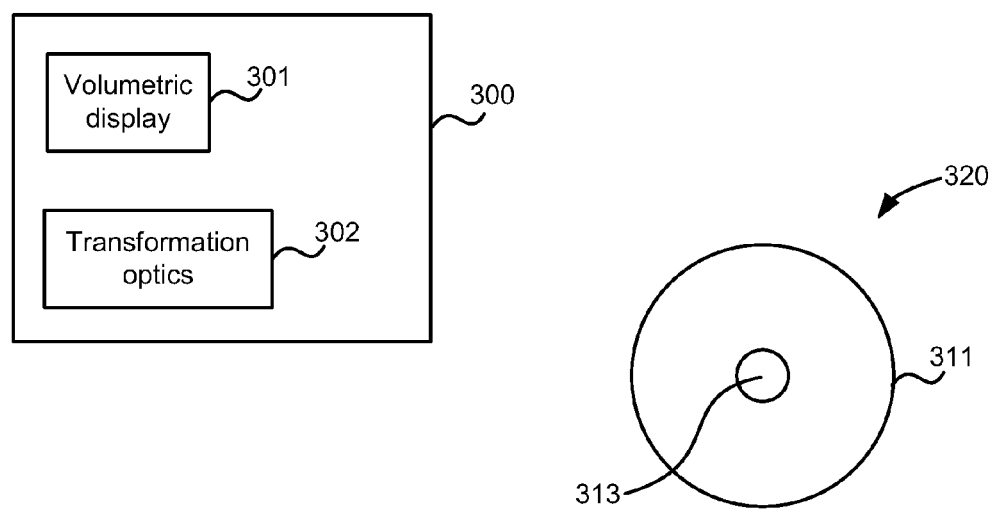

FIG. 3 shows a block diagram of a volumetric display system 300 which comprises a volumetric display 301 and transformation optics 302. The volumetric display 301 generates a 3D light field of an object and the transformation optics 302 creates a position of this 3D light field which is separated in space from the generated 3D light field and for the purposes of the description, this position is referred to herein as a 'virtual position' and the light field at this virtual position is referred to herein as a 'virtual light field'. Through use of the transformation optics 302 the position of the virtual 3D light field can be set to be distant from any rotating parts (and any safety guard) such that a viewer can physically interact with the generated 3D image (in its virtual position). This transformation of the 3D light field can be described with reference to an example implementation 310 of the volumetric display system which is also shown in FIG. 3.

In a first example implementation 310, which is shown in FIG. 3 in both cross-section and from above 320, the volumetric display 301 is as described above and shown in FIG. 1. It comprises an angled diffuser 102 which is rotated (e.g. on a rotation stage 104 with transparent center section 105) in front of a projector 101. The transformation optics 302 comprises a pair of parabolic (or paraboloid) mirrors 311, 312 which may have a substantially identical focal length. The mirrors 311, 312 may be arranged such that the base of the lower parabolic mirror 312 lies substantially at the focal plane of the upper parabolic mirror 311 (i.e. at or close to the focal plane) and the base of the upper parabolic mirror 311 lies substantially at the focal plane of the lower parabolic mirror 312. The upper parabolic mirror 311 has an aperture 313 in its base (which is at the top, in the orientation shown in FIG. 3). The volumetric display 301 and transformation optics 302 are arranged such that the volumetric display creates a 3D image in the bottom of the optical arrangement formed by the two parabolic mirrors 311, 312 and the optical axes of the volumetric display may also be aligned. When viewed by a viewer 314, however, the 3D image appears to 'sit' or 'float' just over the aperture 313, e.g. in a position indicated 315 in FIG. 3. To the viewer 314, the image (at position 315) appears to be a real object but when the viewer attempts to touch or pick up the object, there is nothing there. FIG. 3 also shows a top view 320 of the example implementation 310. This shows the circular upper parabolic mirror 311 and the aperture 313 at its base. The transformation optics 302 used in the example implementation shown in FIG. 3 may, for example, comprise a Mirage® from Opti-Gone International.

As described above, the example implementation 310 in FIG. 3 shows how the transformation optics 302 (e.g. parabolic mirrors 311, 312) performs a translation of the light field originating from the volumetric display 301 (e.g. the combination of the projector 101 and angled diffuser 102 with directional filter 103), allowing it to be recreated away from the moving parts (e.g. the diffuser 102 on the rotation stage 104). This means that a user can physically interact with the generated 3D image (in its virtual position 315). In addition to providing enhanced user satisfaction (and user safety), this enables user input through interaction with the displayed object and/or enables the displayed object to be changed as a result of user interaction and this is described in more detail below.

Figure 7:
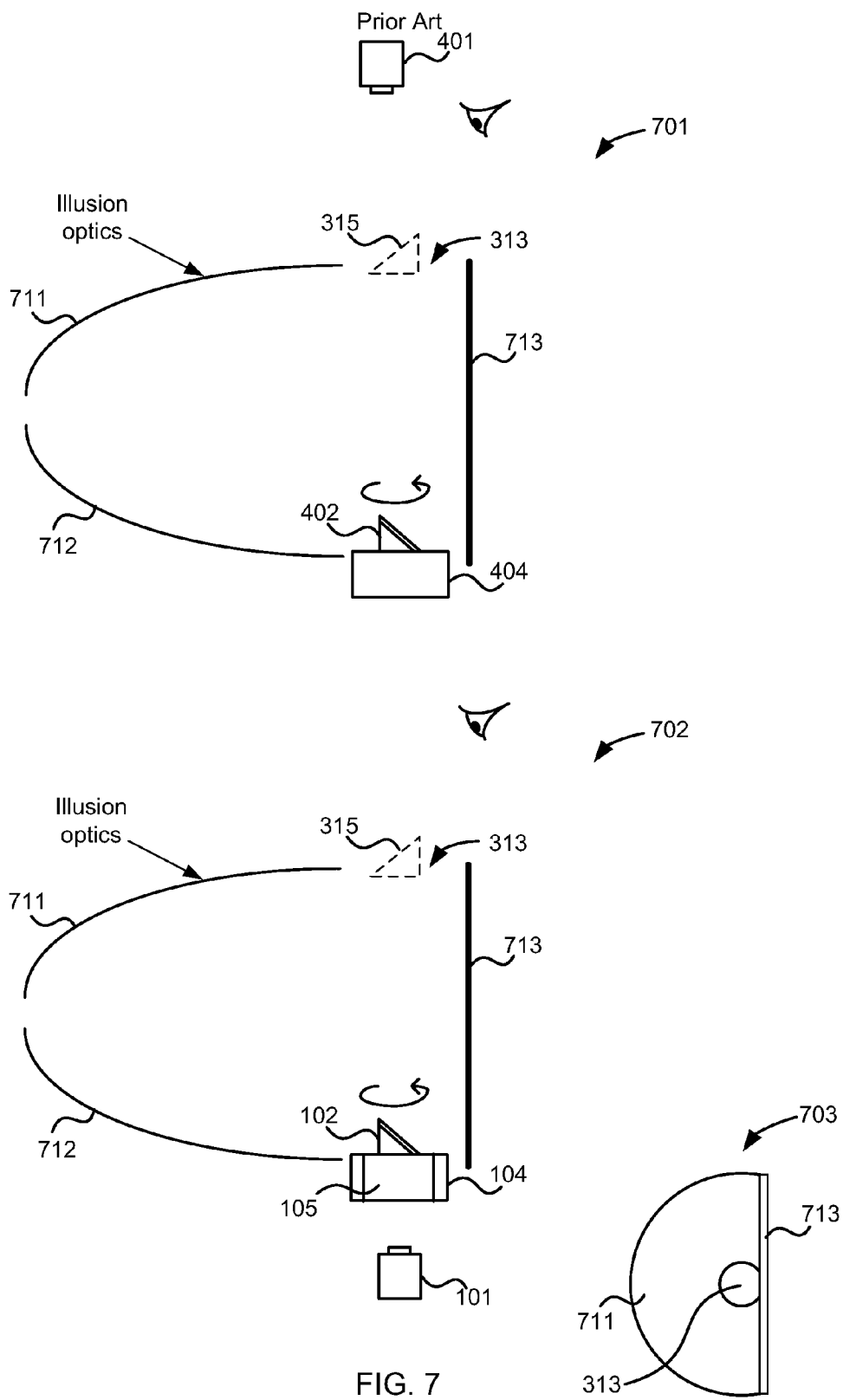
FIGS. 7 and 8 show schematic diagrams of further example implementations of a volumetric display system.
Figure 11:
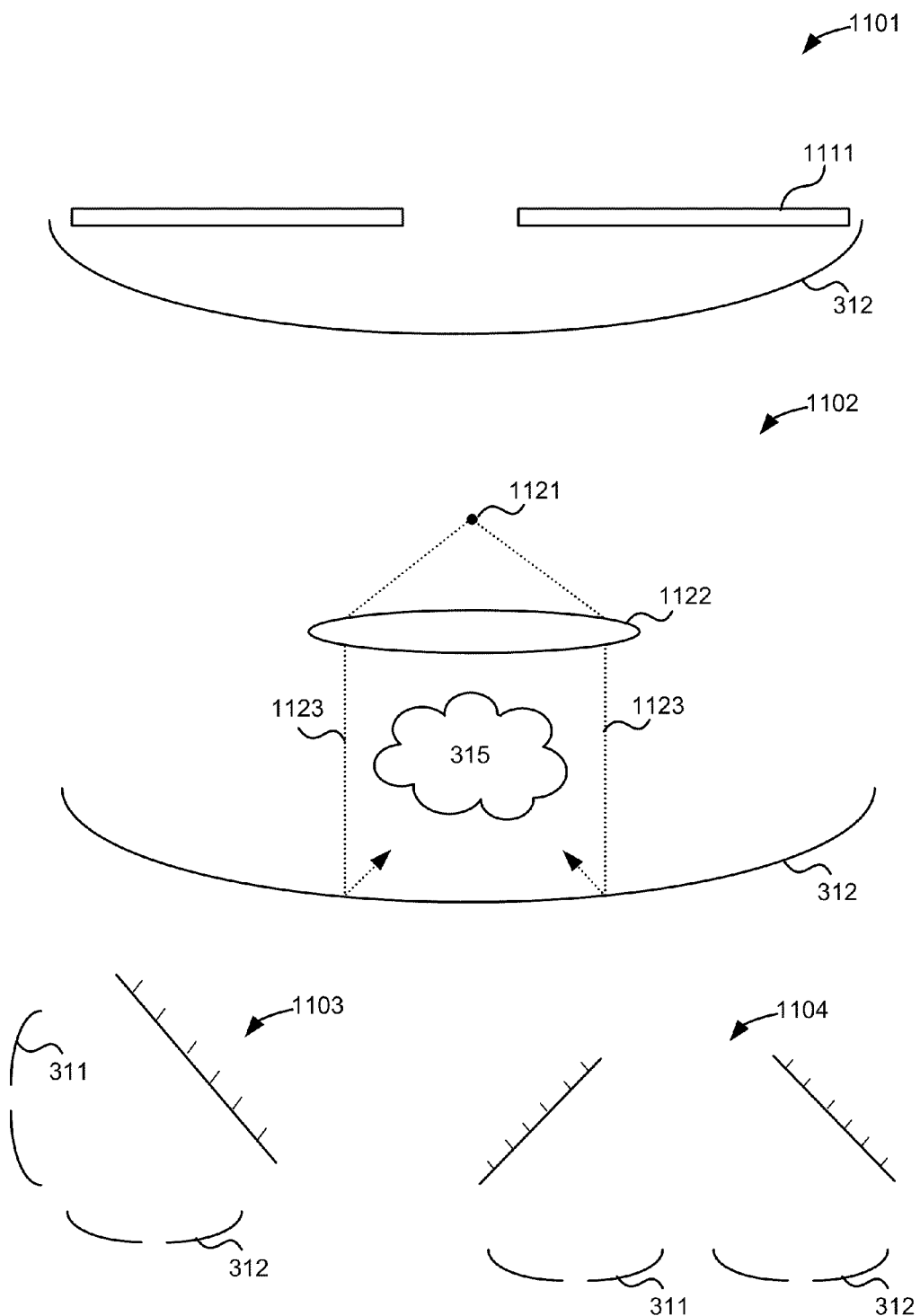
FIG. 11 shows schematic diagrams of various other examples of transformation optics.

Although the volumetric display shown in the example implementation 310 in FIG. 3 does not include the head (or eye) tracking capability described above and shown in FIG. 2, it will be appreciated that any volumetric display 301 may be used (e.g. volumetric display 200 shown in FIG. 2) and various further example implementations are described below. Other volumetric displays not described herein or any other 2D or 3D physical display which can fit into the cavity within the transformation optics 302 may alternatively be used. Other examples include physical object displays comprising real physical objects which are located in the cavity but which can be moved around inside the cavity (such as, for example, small robotic objects or objects which can have their positions altered using magnetism, pneumatics, hydraulics, air, electrical charge or other actuating mechanisms). The examples below also show different transformation optics (e.g. as shown in FIGS. 7 and 11) and it will be appreciated that other optical systems may alternatively be used to provide the spatial transformation of the light field created by the volumetric display.

Figure 4:
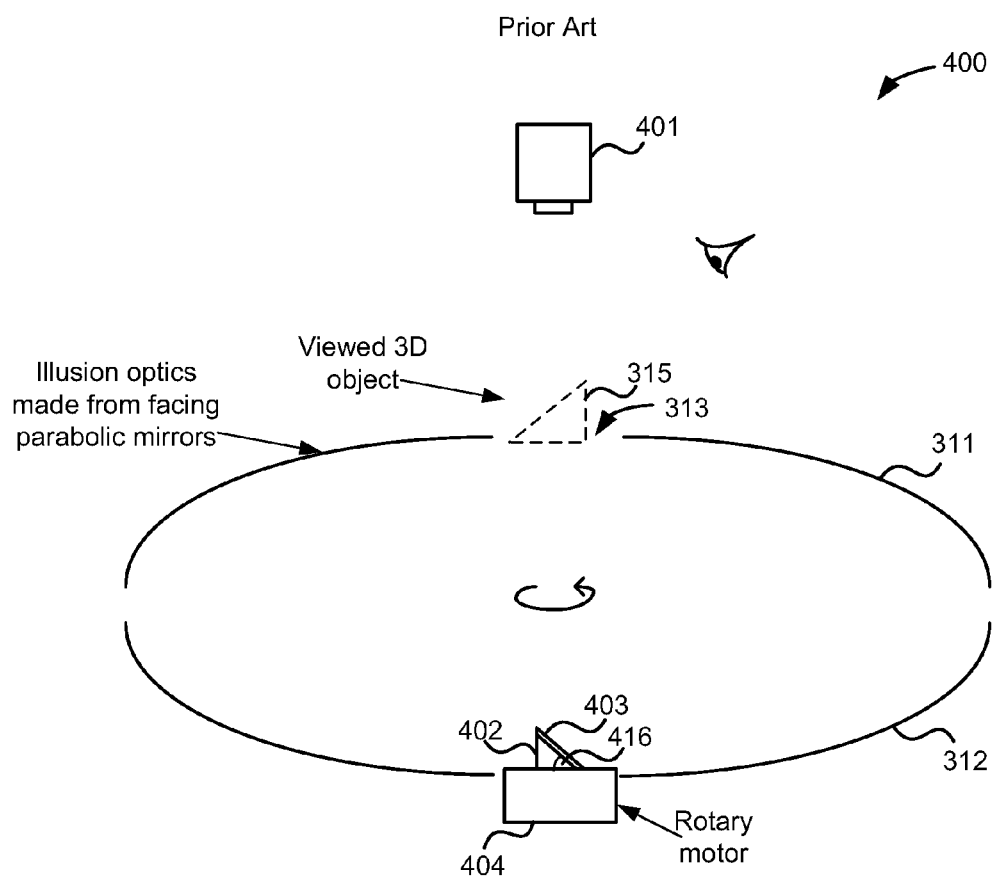
FIG. 4 shows a schematic diagram of another example implementation of such a volumetric display system.

The example 310 in FIG. 3 shows a volumetric display which uses bottom up projection. Alternatively, a volumetric display may be used which involves top down projection, as shown in FIG. 4 (i.e. where the projector and the viewer are on the same side of the image plane/region). In such a top down projection volumetric display, a projector 401 is located above the transformation optics (e.g. parabolic mirrors 311, 312) and projects images through the aperture 313 in the upper parabolic mirror 311 onto an anisotropic angled reflector 402 which, in use, is rotated. The anisotropic reflector 402 may comprise a mirror and a holographic film or coating 403 which provides the anisotropy such that there is a very narrow viewing angle (in the plane of rotation) of an image formed by projection of the image onto the mirror. The angled reflector 402 is rotated (e.g. by mounting it on a rotation stage 404, which may, for example, be a PC cooling fan) and the rotation is synchronized with the projection of different images onto the mirror which provide different views of the object being displayed.

Although the volumetric displays shown in FIGS. 1-4 (and also in FIGS. 7 and 10 described below) comprise a single projector 101, 401 in some examples multiple projectors may be used, e.g. to share the workload between projectors and/or to project different components of an image (e.g. one projector each for red, green and blue). Taken to an extreme, a separate projector may be used for each viewing angle. In another example, a smaller number of projectors may be used in sequence in order to reduce the frame rate that is required by any one of the projectors (e.g. instead of 1 projector operating at 360 frames per second, 4 projectors may be used, each operating at 90 frames per second). Where multiple projectors are used in order to share the workload, the images projected by each of the projectors may be interleaved (e.g. image from projector 1, followed by image from projector 2, etc).

Figure 5:
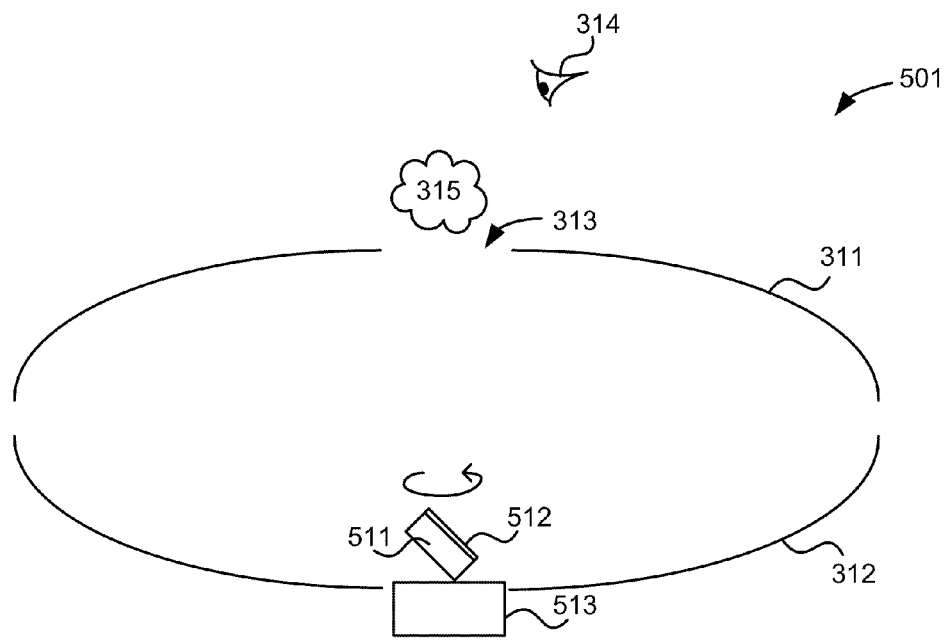
FIG. 5 shows a schematic diagram of a further example implementation of a volumetric display system and two example displays which may be used in such implementations.
Figure 5:
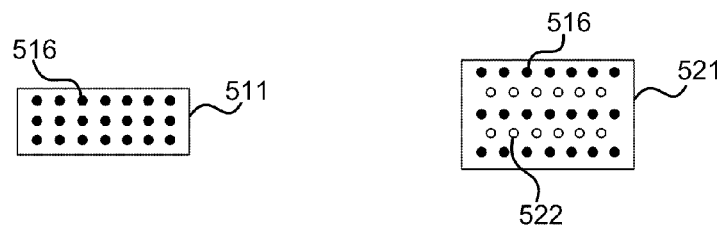

In another example, a volumetric display may be used which comprises an emissive display (e.g. instead of one which comprises a projector, as in FIGS. 3 and 4). Examples of emissive displays include an array of LEDs or OLEDs (organic light emitting diodes), an LCD (liquid crystal display) and a FED (field emission display). In such an example 501, as shown in FIG. 5, the emissive display 511, such as an array of LEDs or OLEDs 516, may be rotated. The emissive display itself may be arranged to provide a narrow viewing angle or the emissive display may be provided with an directional filter 512 (e.g. a holographic film) in a similar manner to the diffuser 102 described above. The emissive display may be rotated by mounting it on a rotation stage 513 and the display may be angled (as shown in FIG. 5) to provide a wide field of view to a user (in the vertical plane).

Figure 6:
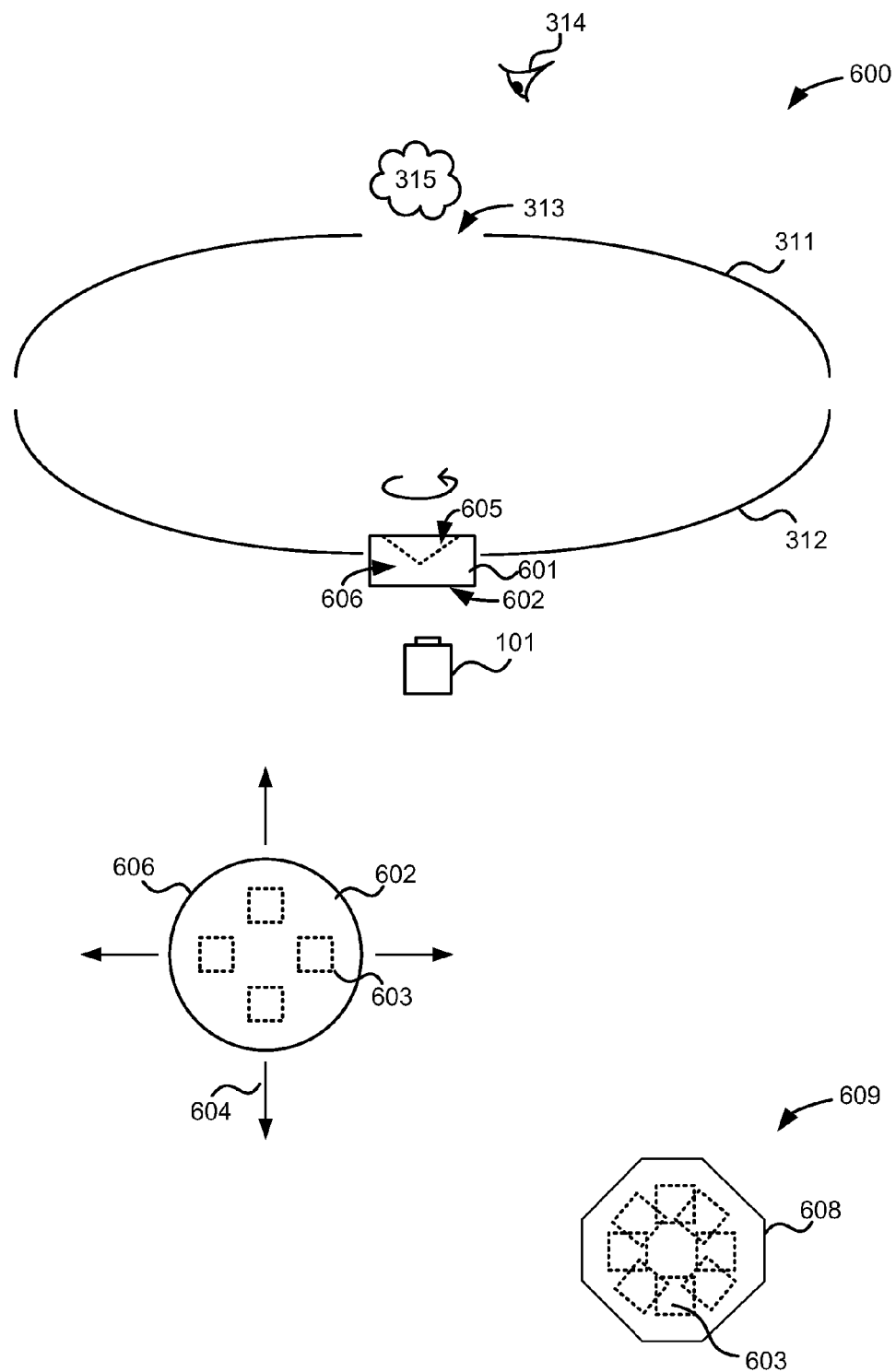
FIG. 6 shows schematic diagrams of another example implementation of a volumetric display system and two stereoscopic objects which may be used in the example.

FIG. 6 shows another example implementation of a volumetric display system 600 which does not involve rotating parts. Instead an optical element 601 is used and by projecting the different views onto different areas (indicated by dotted lines 603) of the lower face 602 of the element, the different views are projected at different angles (as indicated by arrows 604). The optical element 601, shown in FIG. 6 from the side and from below, comprises an angled internal face 605 which reflects the vertically projected light (from projector 101). The curved surface 606 around the outside of the optical element may be covered in an directional filter or film (e.g. holographic or privacy film) for the same reasons as described above. Alternatively the angled internal face 605 may be covered in an directional filter or film. The optical element need not be circular in shape and may instead have many external facets 608 as shown in the simple second example 609 (shown from below). It will be appreciated that whilst the object shown in FIG. 6 has 7 facets, this is by way of example only and an optical element may have a much larger number of facets.

Although FIG. 6 shows use of an optical element 601, 609 (which may be referred to as a 'stereoscopic object') in combination with a projector 101, in another example such an object may be used in conjunction with an emissive display 511 or other type of display. Where an emissive display 511 is used, the display may emit different views of an object under the appropriate parts (indicated by dotted lines 603) of the optical element.

The volumetric display systems described above and shown in FIGS. 3-6 (310, 320, 400, 501-502, 600) provide full 360° walk-around viewing. This means that the displayed object is easily viewed by many people, who can stand all around the volumetric display system without any blind spots. The systems do not have a 'sweet spot' and viewers need not be constrained. Tracking of viewers (e.g. of their position relative to the display system) is not required, although it may be used to augment the system as described in some examples herein. In some situations, however, full 360° walk-around viewing may not be required and instead the transformation optics may be modified such that they are more compact and provide a reduced viewing angle in the horizontal direction (i.e. in the plane of rotation, in the examples of FIGS. 3 and 4). In addition to reducing the form factor of the system, the overall cost of the system may also be reduced. FIG. 7 shows two examples 701, 702 of such a volumetric display system in which the viewing angle is reduced to 180° in the horizontal direction. In these examples, the transformation optics 302 are provided by two portions 711, 712 of parabolic mirrors (e.g. halves of parabolic mirrors 311, 312) which are aligned in a similar manner to described above, i.e. such that the base of the lower parabolic mirror portion 712 lies substantially at the focal plane of the upper parabolic mirror portion 711 and the base of the upper parabolic mirror portion 711 lies substantially at the focal plane of the lower parabolic mirror portion 712. The vertical surface 713 (in the arrangement shown in FIG. 7) does not need to be a reflective surface although it can be made so. A top view 703 of the transformation optics is also shown. Although these examples show truncated transformation optics which provide a viewing angle of 180° in the horizontal direction, the optics may be further truncated (e.g. by providing wedge shaped portions (or segments) of the circular parabolic mirrors 311, 312 with smaller angles) to provide a smaller form factor at the expense of a further reduced viewing angle. However, where the volumetric display system is not intended for concurrent viewing by multiple users, the large viewing angle provided by systems described above may not be required.

Figure 8:
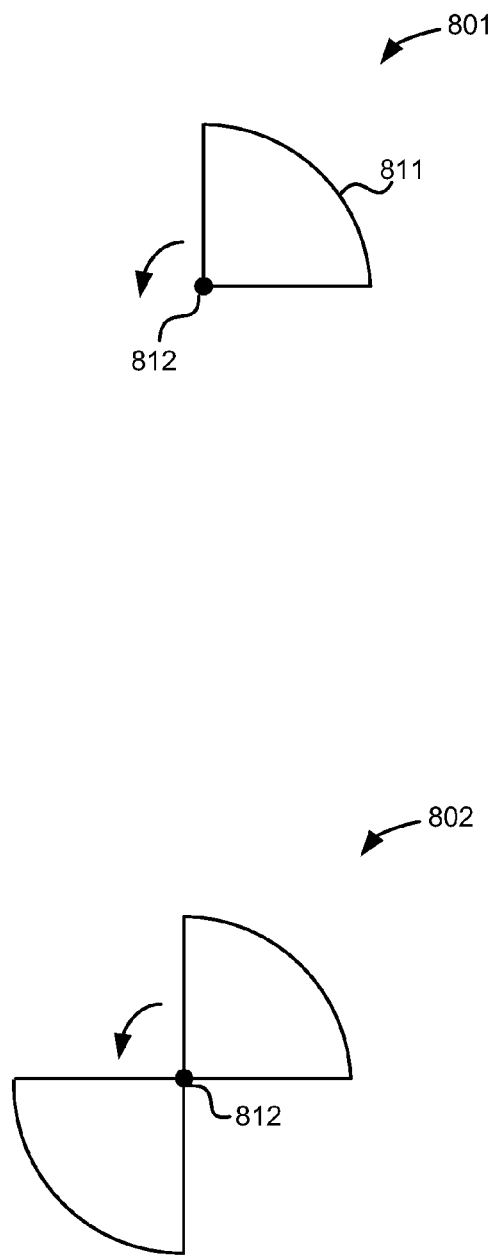

In a variation of the systems shown in FIG. 7 which include truncated transformation optics, the segments of the parabolic mirror (e.g. a quarter slice) may be spun around the optical axis in order to mimic (or simulate) the effect of a full parabolic mirror, as shown in the schematic diagram in FIG. 8. FIG. 8 shows two examples: the first 801 shows a quarter segment 811 of both the upper and lower parabolic mirrors which may be spun around a central axis 812; and the second 802 shows two segments in a 'bow-tie' arrangement which provides mechanical balancing as they are spun around the central axis. It will be appreciated that further examples may include more than two segments (of both the upper and lower parabolic mirrors) which are spun around the central axis.

In the examples shown in FIG. 8, a black matte backdrop or box may be provided behind the spinning segments in order that there is no undesired background image showing. Alternatively, one or more cameras or other optical sensors may be located underneath the spinning segments which can view the environment past the mirrors by synchronizing the capturing of images with the spinning of the mirror segments.

It will be appreciated that whilst the segments are described as being spun around the central axis, in further examples they may be panned through a smaller arc and hence provide a smaller viewing angle (in an analogous manner to the non-spinning portions shown in FIG. 7). In other implementations the segment may not be spun continuously but may be rotated dynamically as required to make sure it is correctly positioned with respect to a tracked viewer in order to view the floating image. In such an implementation, the motion of the segment (s) may be adjusted in response to the detection of a position of a viewer (e.g. using the head/eye tracking as described above).

Where non-spinning parabolic mirrors, or sections thereof, are used, the parabolic mirrors may be semi-rigid or rigid. However, in the examples shown in FIG. 8 where the mirrors are spun around a central axis (also referred to as the 'optical axis'), a rigid, semi-rigid or a flexible mirror may be used. In an example using a flexible mirror (e.g. a flexible reflective membrane), the parabolic shape may be generated, at least in part, by the centrifugal motion with possible adjustable tensioners which may, in some examples, enable the shape and focal lengths or the optics to be adjusted dynamically. By spinning such a flexible mirror around its optical axis it emulates the effect of a rigid parabolic mirror.

In some implementations of the volumetric display system, the projected views of an object (i.e. the different projected images for each viewing angle) may be distorted. This distortion is a result of the fact that the 3D light field formed by the volumetric display 301 cannot all be formed at the focal point or focal plane of the upper parabolic mirror 311 (or 711 in the truncated examples). This distortion may for example result in an expansion of the radial size of the object with distance from this focal point. In many applications, any distortion may not be noticeable or may not affect the operation of the system. However, some systems may use one or more different techniques to compensate for any distortion and two example techniques are described herein. In a first example, the projected images (or the displayed images, where an emissive display 511 is used) of the object may be modified to ensure that the resultant 3D object which is visible to a viewer is not distorted, e.g. performing a compensatory pre-distortion by radially inwardly compressing the top of the object in the images as projected. In another example, the shape of the diffuser 102 or mirror 402 may be selected to compensate for this effect (e.g. such that the diffusing/reflective surface is not planar).

As described above, many volumetric displays do not display a different image if the viewer moves their head vertically but instead the same view is visible irrespective of the viewing height. One solution to this is to include the head/eye tracking capability described above (and shown in FIG. 2) in any of the example implementations described herein. Alternatively multiple 3D views may be created for different viewing heights and multiple 3D light fields created by a volumetric display where the 3D light field visible to a viewer is dependent upon their vertical viewing angle (as well as the horizontal viewing angle, as is already the case in the volumetric display systems described above). This projection of multiple 3D views may be achieved by mounting the angled diffuser 102 or mirror 402 on a mount such that the angle of tilt of the diffuser or mirror (labeled 316, 416 in FIGS. 3 and 4 respectively) can be adjusted as the element is rotated and by synchronizing the image projected onto the diffuser/mirror with both the angle of rotation and the tilt angle of the diffuser/mirror (as the diffuser/mirror is rotated and its tilt angle is adjusted). In another example, the diffuser/mirror may not be planar. As described above, a single projector may be used or multiple projectors may be used. In an example, a separate projector (or group of projectors) may be used for each viewing height.

Figure 9:
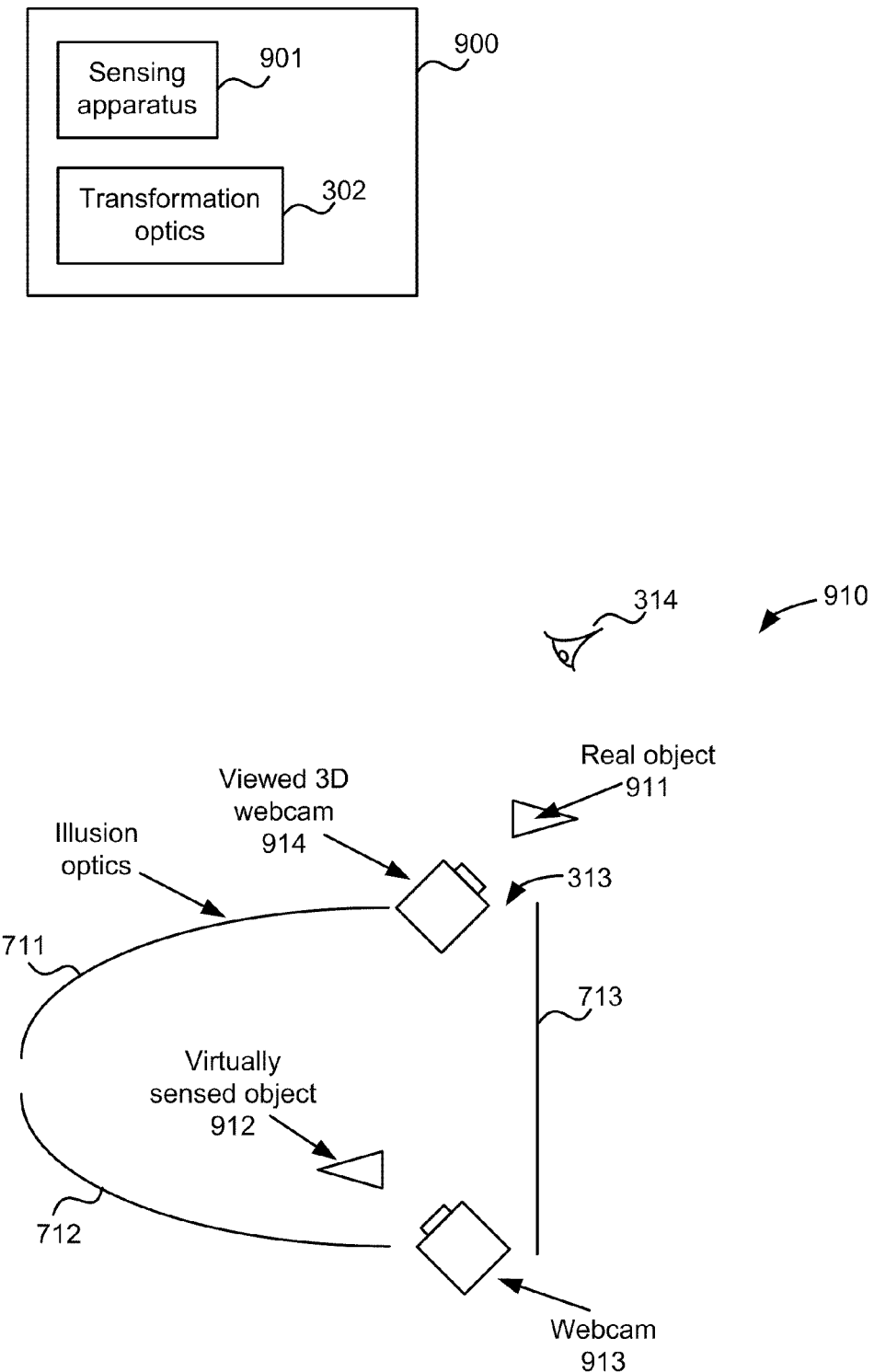
FIG. 9 shows a block diagram of a sensing system and an example implementation of such a system.

The transformation optics 302 described above are bidirectional and as a result the optics 302 may be used in a sensing system. FIG. 9 shows a block diagram of a sensing system 900 which comprises a sensing apparatus 901 and transformation optics 302. An example implementation 910 is also shown in FIG. 9, which uses truncated transformation optics (e.g. as described above with reference to FIG. 7) by way of example only. It will be appreciated that other forms of transformation optics (e.g. circular parabolic mirrors 311, 312 as shown in FIG. 3) may alternatively be used. When an object 911 is placed above the aperture 313 in the parabolic mirrors, the transformation optics create a virtually sensed object 912 within the cavity. This can be captured using a web camera 913 or other optical sensing apparatus (e.g. stereo cameras, multiple cameras, 3D depth sensing cameras, optical proximity sensors, light field cameras etc) which is located in the bottom of the optical arrangement formed by the two parabolic mirrors 711, 712. As a result of the bidirectional properties of the transformation optics, a virtual 3D image 914 of the web camera 913 is also created just above the aperture 313 in the mirrors and this assists the user to place the object 911 in the right position to be seen by the web camera. To the user 314, they appear to be holding the real object 911 in front of the viewed, but virtual, web camera 914.

Although in FIG. 9, the web camera 913 is shown as being statically mounted, the sensing apparatus 901 may be mounted onto a rotating object (e.g. a rotation stage) if required. Use of a rotating sensing apparatus enables multiple views of the real object 911 to be captured, which may subsequently be used to create a virtual display of the object (e.g. using a volumetric display system as described above) or for another purpose. The sensing system 900 may be used to enable user input to a computing system or other device. The user input may be provided through gestures or detection of other movement by the sensing system.

Figure 10:
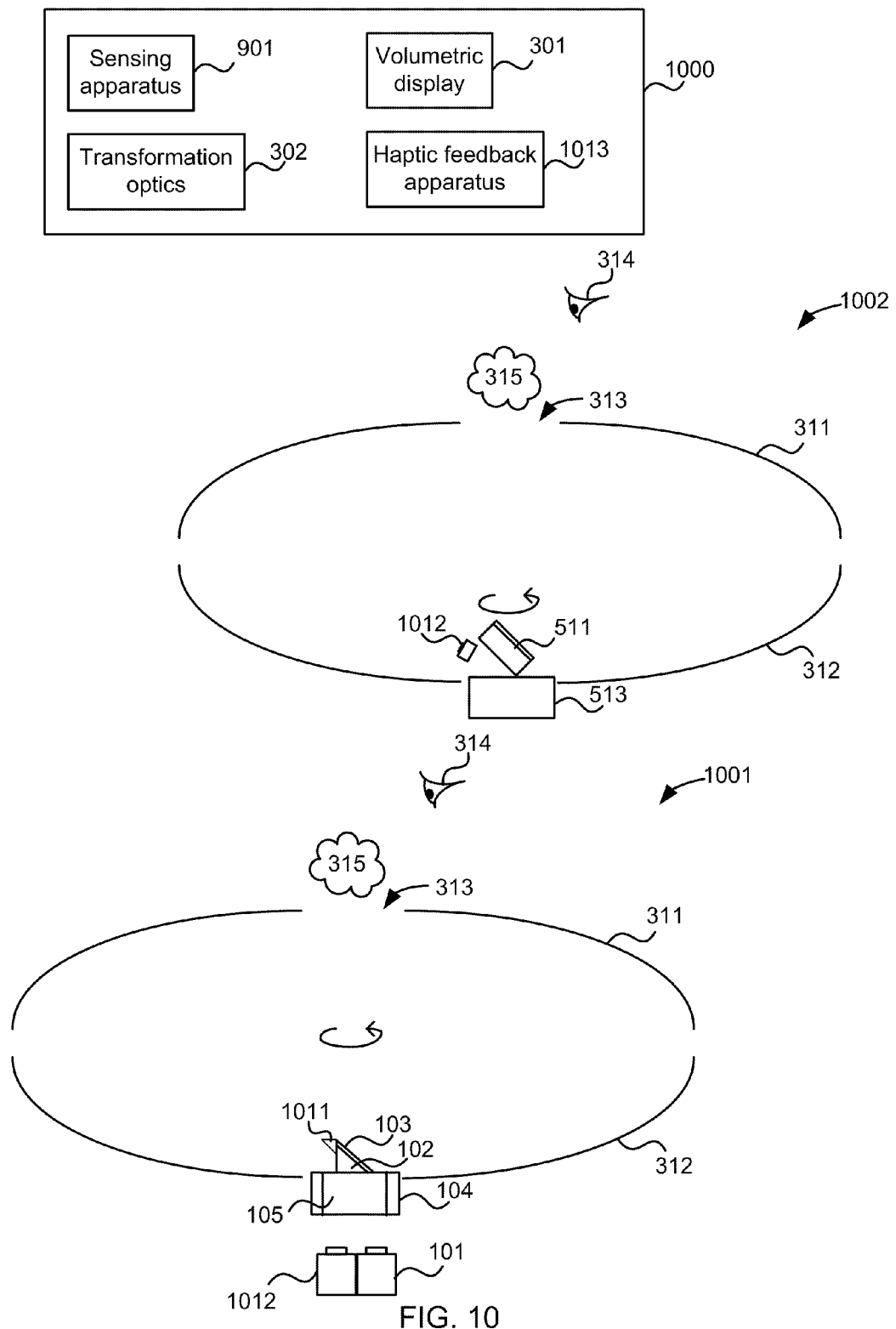
FIG. 10 shows a block diagram of a volumetric display and sensing system and schematic diagrams of two example implementations of such a system.

The sensing system 900 shown in FIG. 9 may be combined with a volumetric display system 300 (described above) to create a volumetric display and sensing system 1000, as shown in the block diagram in FIG. 10. FIG. 10 also shows two example implementations 1001, 1002. In the first example, 1001, a camera 1012 (which may be a web camera 913) or other sensing apparatus is located below the rotation stage 104 and a reflective element 1011 may be located on the rotation stage. In the second example, 1002, the camera 1012 (or other sensing apparatus) may be located on the rotation stage. In a further example, an optical sensor 202 which is used for head/eye tracking (as shown in FIG. 2) may also be used to detect other objects in proximity to the volumetric display and sensing system 1000. Although FIG. 10 shows a single projector 101 and a single camera 1012, it will be appreciated that multiple projectors and/or cameras may be used. Top down projection may also be used instead of bottom up projection. In a further example, the emissive display 511 shown in FIG. 5 may be replaced by a display 521 which includes one or more optical detectors 522 (e.g. a ThinSight display, as described in 'ThinSight: integrated optical multi-touch sensing through thin form-factor displays' by S. Izadi, S. Hodges, D. A. Butler, A. Rrustemi and W. Buxton and published in the Proceedings of the 2007 workshop on Emerging displays technologies: images and beyond: the future of displays and interaction) and therefore the display 521 provides both the functionality of the sensing apparatus 901 and the emissive display 511.

The sensing apparatus 901 may use any wavelength(s) for sensing and the apparatus is not restricted to visible wavelengths. In an example, infra-red (IR) sensing may be used (e.g. detectors 522 may be IR detectors). Furthermore, although the above examples show a sensing apparatus 901 which senses optically via the transformation optics, in other examples alternative sensing techniques may be used (e.g. ultrasonic sensing). Although FIG. 10 shows a sensing system which is within the optical cavity formed by the volumetric display, in other examples, a sensing system which is located outside the optical cavity may alternatively be used (e.g. a camera with a fish eye lens).

There are many different applications for a combined volumetric display and sensing system 1000. In an example, the system 1000 may be used to image an object and then subsequently to display a 3D representation of the imaged object. In this case, multiple views of the object may be captured by, for example, rotating the object or the sensing apparatus. In order that both the top and bottom views of the object are captured, a top down camera may also be used. The top down camera may comprise just a camera or alternatively a second set of transformation optics (e.g. another pair of parabolic mirrors) and a camera may be used.

In another example, the sensing may be used to enable user input through 'touching' the displayed object and this user input may result in a change of the displayed object and/or control of a software application, device etc. It will be appreciated that the user does not actually touch the displayed object but instead can physically interact with the 3D light field which is created by the system, e.g. with the virtual 3D object in the region 315 shown in the FIGS. There are many ways in which the displayed object may be changed in response to user input and examples include, but are not limited to:

making the 3D object semi-transparent,
   deforming the surface of the 3D object to mimic the effect of the user pushing against or otherwise manipulating the physical object (e.g. as if the object were made of a pliable material such as modeling clay),
   adjusting the apparent illumination of the displayed object (e.g. to make areas that have been 'touched' brighter),
   adding shadows to the displayed object (e.g. as if caused by the user's hand or an interaction object), and
   displaying cut away views of the 3D object (e.g. with the surface layers missing) as if the interior of the 3D object had been exposed.

Any known computer design animation technique may be added to the display in addition to (or instead of) using any of the examples described above. For example, computer design animation techniques such as glowing fingertips may be used (e.g. providing a halo effect around a user's fingertips or around the part of the object which has been 'touched').

In a further example, the sensing apparatus 901 may be used to sense the environment around the system 1000 and modify the displayed object as a result. For example, the displayed object may be modified to include virtual reflections (e.g. which mimic specular or diffuse reflections) of objects in the environment (e.g. where the displayed object is reflective or partially reflective, such as a coin). In an example, the synthesized reflections may include appropriate angular reflections of the users and/or the environment. The displayed object may also be modified to take into consideration light sources or provide shadows as a result of sensing the environment (e.g. where the user places their hand between the virtual light field and a light source in the environment). In another example, the system could render the 3D object taking into account the surrounding lighting conditions such that shadows are realistically shown for the environment the display is placed in. An example of this would be where a user shines a simple torch onto the viewed object and those parts of the displayed 3D object facing away from the torch are made dark (shadowed) whereas parts of the object being displayed nearest to the torch appear brightly illuminated. Incorporation of aspects of the sensed environment in this way (e.g. through synthesizing shadows, reflections and other optical features correctly with respect to the surrounding environment and the viewed direction) increases the realism of the displayed object. In an example, a light field camera or multiple 3D cameras may be used to capture images (e.g. multiple) images of the environment and the captured images may be processed to determine how the displayed objects should be modified. Other image processing techniques may also be used (e.g. to remove any blurring in the captured images of the environment).

In addition to, or instead of, modifying the displayed object (e.g. modifying the projected views of the object), the user inputs which may be detected using the sensing apparatus 901 may result in the user being provided with haptic feedback. In an example, the system 1000 may further comprise air jets or other mechanism (e.g. haptic feedback apparatus 1013) to provide physical feedback to the user when 'touching' the displayed object. The air jets may be used to provide a user with a sensation of touch and in an example, the air jets may be generated within the optical cavity of the volumetric display 301.

The interaction between the user and the displayed 3D object need not only be through use of the user's hands and fingers. In some examples, a user may use a physical object (referred to herein as an 'interaction object' e.g. a pointer, stylus or ruler) to interact with the displayed 3D object and in such an example, the haptic feedback (e.g. the air jets) may be used to provide gentle force on the physical object when it appears (to the user) to come into contact with the displayed object. This use of haptic feedback increases the realism of the display and the user interaction with the displayed object. Where an interaction object is used, the object may be semi-transparent so that the user's view of the displayed object is not completely obscured by the interaction and to minimize any shadowing of the mirror/diffuser.

Another technique which may be used to increase the realism of any displayed 3D object is to combine the use of computer generated images with use of real objects. In an example of this, a real object may be placed in the bottom of the transformation optics (e.g. in the bottom of the cavity created by the parabolic mirrors). The transformation optics result in the real object being visible to a viewer just above the aperture in the parabolic mirrors (in a similar manner to the web camera shown in FIG. 9). Additional computer generated objects may be displayed alongside the real object using a projection apparatus such as shown in FIGS. 3, 4 and 7 and/or the projection apparatus may be used to augment the real object in any way. Any real object may be placed inside the cavity, e.g. a ruler to provide a sense of scale for a computer generated object, a miniature lens or a mirror.

Real objects may also be used in the sensing system 900 shown in FIG. 9 to enable user input through interaction with the virtual image of the real object which is formed by the transformation optics 302. For example, if a real object is placed inside the cavity formed by the portions of parabolic mirrors 711, 712 and close to the web camera 913, the web camera (or other sensing apparatus 901) may be used to detect interaction between a user and the virtual image of the real object, e.g. when a user's fingers appear to come into contact with the real object. The user input may be dependent upon the nature of the detected interaction, e.g. the part of the real object which is 'touched' by the user, the manner in which the user places their fingers or an interaction object on (or 'in') the real object etc. In an example, a computer mouse may be placed inside the cavity such that the virtual image of a computer mouse is generated above the aperture in the transformation optics. Interaction between a user and the virtual image of the mouse may be detected by the sensing apparatus and used to control a software program (e.g. an operating system or application). Such a virtual mouse may be useful in environments where there are particular concerns about risks of contamination and where the number of physical objects that are present and need to be cleaned is minimized. The combined volumetric display and sensing system may be located behind a planar panel (e.g. a glass, plastic or other transparent panel) which can be easily kept clean. Virtual mice may also be beneficial in other environments. In another example, a remote control may be placed inside the cavity to provide a virtual remote control.

Although the examples described above show the two parabolic mirrors (311, 312 or 711, 712) as being located in contact with each other or in close proximity, this is by way of example only. In other examples, the parabolic mirrors may be spaced apart. In such an example, the mirrors are still arranged such that the base of the lower parabolic mirror lies at the focal plane of the upper parabolic mirror and the base of the upper parabolic mirror lies at the focal plane of the lower parabolic mirror, but use of mirrors of longer focal lengths enables the mirrors to be physically separated.

FIG. 11 shows various other examples of transformation optics which may be used in any of the examples described herein. In a first example 1101, there is no upper parabolic mirror 311. A Fourier emissive source 1111 (e.g. a 2D array where the amplitude and phase of each element can be controlled) is used to generate the Fourier Transform of the object to be displayed. In a second example 1102, which also does not use an upper parabolic mirror 311, an alternative optical arrangement 1121-1122 is used to achieve the same optical result. In this example, a source 1121 and lens arrangement 1122 is used to generate a collimated (as indicated by dotted lines 1123) Fourier transform of the image. Having been incident on the lower parabolic mirror 312, the virtual image is formed in the region 315 indicated. Other optical arrangements may alternatively be used to move the generated 3D light field (from a volumetric display) away from any moving parts in order that a user can interact with the generated 3D image. For example, mirrors may be used to provide a different physical arrangement of the parabolic mirrors which has the equivalent optical arrangement (e.g. so that the parabolic mirrors may be placed at an angle to each other or side by side etc as shown in examples 1103 and 1104).

The parabolic mirrors (or segments thereof) in the examples described above may be fully reflective (e.g. at all wavelengths) or may be reflective at only some wavelengths. In an example, the mirrors may be reflective to visible light but transparent to infra-red light and in such a situation the sensing apparatus 901 may comprise an infra-red camera placed underneath the transformation optics 302 and which images through the transformation optics. It will be appreciated that this is just one example of wavelength selective reflectivity and imaging and other wavelengths may alternatively be used. In a further variation, the parabolic mirrors may comprise switchable mirrors (e.g. mirrors which can be switched between a reflective and a transmissive state).

Figure 12:
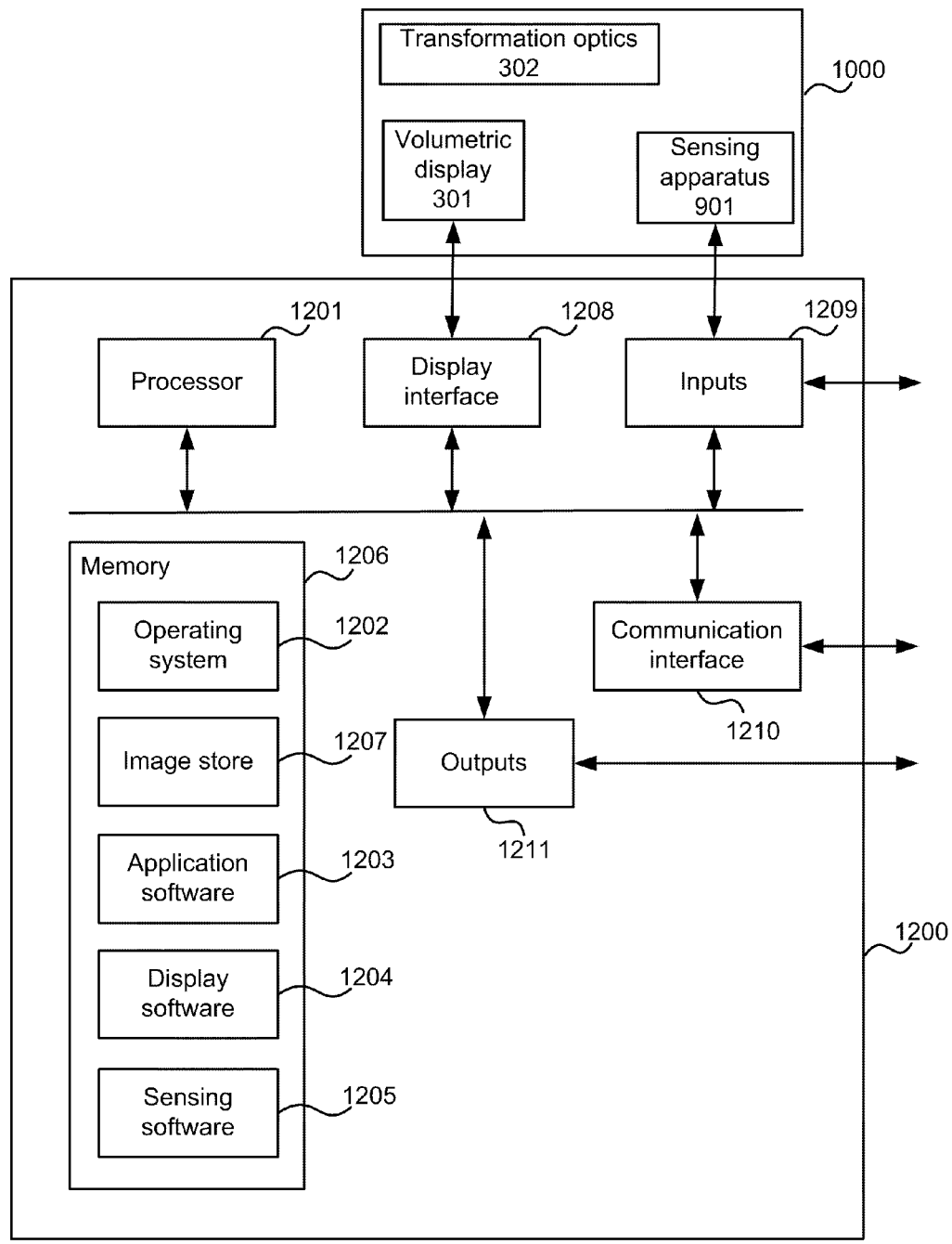
FIG. 12 illustrates an exemplary computing-based device which may be controlled by and/or interface to any of the systems described herein.

FIG. 12 illustrates various components of an exemplary computing-based device 1200 which may be implemented as any form of a computing and/or electronic device, and which may be controlled by a combined volumetric display and sensing system 1000 and/or interface with any of the systems described herein (e.g. systems 300, 900). A combined volumetric display and sensing system 1000 is shown in FIG. 12 by way of example only.

Computing-based device 1200 comprises one or more processors 1201 which may be microprocessors, controllers or any other suitable type of processors for processing computing executable instructions to control the operation of the device in order to generate and/or display different views of an object, sense user interaction, control a software program based on the sensed user interaction etc. Platform software comprising an operating system 1202 or any other suitable platform software may be provided at the computing-based device to enable application software 1203-1205 to be executed on the device. The application software may include display software 1204 which is arranged to display the different views of an object using a volumetric display 301 and may further be arranged to generate these different views. The application software may include sensing software 1205 which is arranged to interpret signals provided by a sensing apparatus 901, e.g. to convert them into user inputs for other application software 1203 or for the operating system 1202.

The computer executable instructions may be provided using any computer-readable media, such as memory 1206. The memory may be of any suitable type such as random access memory (RAM), a disk storage device of any type such as a magnetic or optical storage device, a hard disk drive, or a CD, DVD or other disc drive. Flash memory, EPROM or EEPROM may also be used. The memory may also provide an image store 1207 for storing the various views of an object to be displayed and for storing any images captured by the sensing apparatus 901. Alternatively the views of an object may not be stored locally but may be generated dynamically (e.g. by the computing-based device) and/or transmitted to the computing-based device 1200 from another device (e.g. a remote server).

The computing-based device may comprise a display interface 1208 which interfaces to the volumetric display 301 and an input 1209 which receives signals from a sensing apparatus 901. Further inputs may also be provided. The device may also comprise a communication interface 1210 (e.g. for receiving views for display from a remote server) and one or more outputs 1211.

The systems and apparatus described above allow the creation of a true 3D volumetric image which supports direct user interaction. Although the present examples are described and illustrated herein as generating a 3D image, the examples are also suitable for generating a 2D image which supports direct user interaction in a similar manner. In some examples, a 3D image may be generated but the sensing apparatus may operate in 2D, or vice versa.

It will be appreciated that the orientations shown in the FIGS. and described above (e.g. using terminology such as horizontal, vertical, upper, lower etc) are by way of example only and the volumetric display systems described above may be positioned in any orientation which is required. For example, the arrangement shown in FIG. 3 may be inverted such that the projection is vertically down and the virtual 3D object appears to hover below the aperture 313 in the parabolic mirror 311 (referred to above as the 'upper parabolic mirror' but which is now below the second parabolic mirror 312). In such an arrangement, the volumetric display system may be located within a ceiling panel such that it is not visible to a user. In another example, the second arrangement 702 shown in FIG. 7 may be rotated through 90° such that the projection is horizontal. In such an orientation, the virtual 3D object may be viewed from above and the volumetric display system may be located within a wall panel.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A volumetric display system comprising:
a volumetric display arranged to generate a light field;
transformation optics comprising at least a lower parabolic mirror disposed opposite to an upper parabolic mirror, the lower parabolic mirror and upper parabolic mirror forming an optical cavity and being arranged to generate an image of the first light field spatially separated from the light field; and
a sensing apparatus arranged at the lower parabolic mirror of the optical cavity and arranged to optically detect a user interaction with the image of the light field via the transformation optics, the sensing apparatus being further arranged to detect a height position of the user, the volumetric display being arranged to generate the light field based on the height position, the volumetric display being further arranged to adjust a refresh rate based on a viewing angle for the user and to include a reflection image of at least part of the user in the light field.

2. A volumetric display system according to claim 1, wherein the lower parabolic mirror and upper parabolic mirror are arranged such that a base of the lower parabolic mirror lies substantially at a focal plane of the upper parabolic mirror and a base of the upper parabolic mirror lies substantially at a focal plane of the lower parabolic mirror.

3. A volumetric display system according to claim 1, wherein the volumetric display comprises:
a directional optical element and a projector, wherein the projector is arranged to project a sequence of different images onto the directional optical element in synchronization with an angle of rotation of the directional optical element and wherein the directional optical element comprises one of a diffuser in combination with a directional filter and an anisotropic mirror.

4. A volumetric display system according to claim 3, further comprising an optical sensor arranged to detect a position of a user relative to the volumetric display system.

5. A volumetric display system according to claim 4, wherein at least one of the sequence of different images is selected based on the detected position of the user.

6. A volumetric display system according to claim 1, wherein the volumetric display comprises:
an array of emitters arranged to display a sequence of different images; and
at least one optical detector.

7. A volumetric display system according to claim 1, wherein:
the volumetric display is arranged to display a sequence of different images; and
at least one of the sequence of different images is modified based on said user interaction.

8. A volumetric display system according to claim 1, further comprising:
a haptic feedback apparatus responsive to said user interaction.

9. A volumetric display system according to claim 1, wherein:
the volumetric display is arranged to display a sequence of different images, and
the sensing apparatus is arranged to detect an environment around the system, at least one of the sequence of different images being modified based on said environment.

10. A volumetric display comprising:
a projector;
a diffuser with a directional filter rotatable in front of the projector, wherein the projector is arranged to project a sequence of different images onto the diffuser in synchronization with an angle of rotation of the diffuser;
an optical system comprising at least a lower portion of a parabolic mirror opposite an upper portion of the parabolic mirror, the lower portion of the parabolic mirror opposite the upper portion of the parabolic mirror forming an optical cavity and arranged to perform a spatial translation of a light field generated by the projector and the diffuser to generate an image of the light field;
an optical sensor arranged in the lower portion of the optical cavity and arranged to detect a position of a user relative to the volumetric display, wherein at least one image of the sequence of different images is selected based on the detected position of the user, the optical sensor being further arranged to detect a viewing height position of the user, the at least one image of the sequence of different images selected based on the viewing height position; and
a sensing apparatus arranged in the lower portion of the optical cavity, wherein the sensing apparatus is arranged to optically detect a user interaction with the image of the light field via the optical system, the projector being further arranged to adjust a refresh rate based on a viewing angle for the user and to include a reflection image of at least part of the user in the sequence of different images.

11. A volumetric display according to claim 10, wherein the sequence of different images are of a computer generated object and wherein the volumetric display further comprises a physically real object.

12. A volumetric display according to claim 10, wherein, in use, the at least lower and upper portions of the parabolic mirror are rotated around an optical axis of the parabolic mirror.

13. A volumetric display according to claim 12, wherein the parabolic mirror comprises a flexible reflective membrane.

14. A system comprising:
a volumetric display;
transformation optics comprising at least a lower parabolic mirror opposite an upper parabolic mirror forming an optical cavity and arranged to generate an image of a 3D light field generated by the volumetric display, wherein the image of the 3D light field is spatially separated from the 3D light field generated by the volumetric display; and
sensing apparatus located within the lower parabolic mirror of the optical cavity and arranged to optically detect a user interaction with the generated image, the sensing apparatus being further arranged to detect a viewing height of a user performing the user interaction, the volumetric display generating the 3D light field based on the viewing height, the volumetric display adjusting a refresh rate based on a viewing angle for the user and including a reflection image of at least part of the user in the 3D light field.

15. A system according to claim 14, wherein the sensing apparatus and the volumetric display comprise an array of infra-red (IR) optical detectors, the array of IR optical detectors being arranged adjacent to an array of light emitting diodes (LEDs) and/or organic light emitting diodes (OLEDs).

16. A system according to claim 15, wherein the volumetric display is rotatable in the lower parabolic mirror of the optical cavity.

* * * * *